H. C. FORD.
SPEEDOMETER.
APPLICATION FILED JAN. 15, 1916.

1,297,554.

Patented Mar. 18, 1919.
4 SHEETS—SHEET 1.

Witnesses:

Inventor
Hannibal C. Ford
By his Attorneys
Rosenbaum, Stockbridge & Tilbert

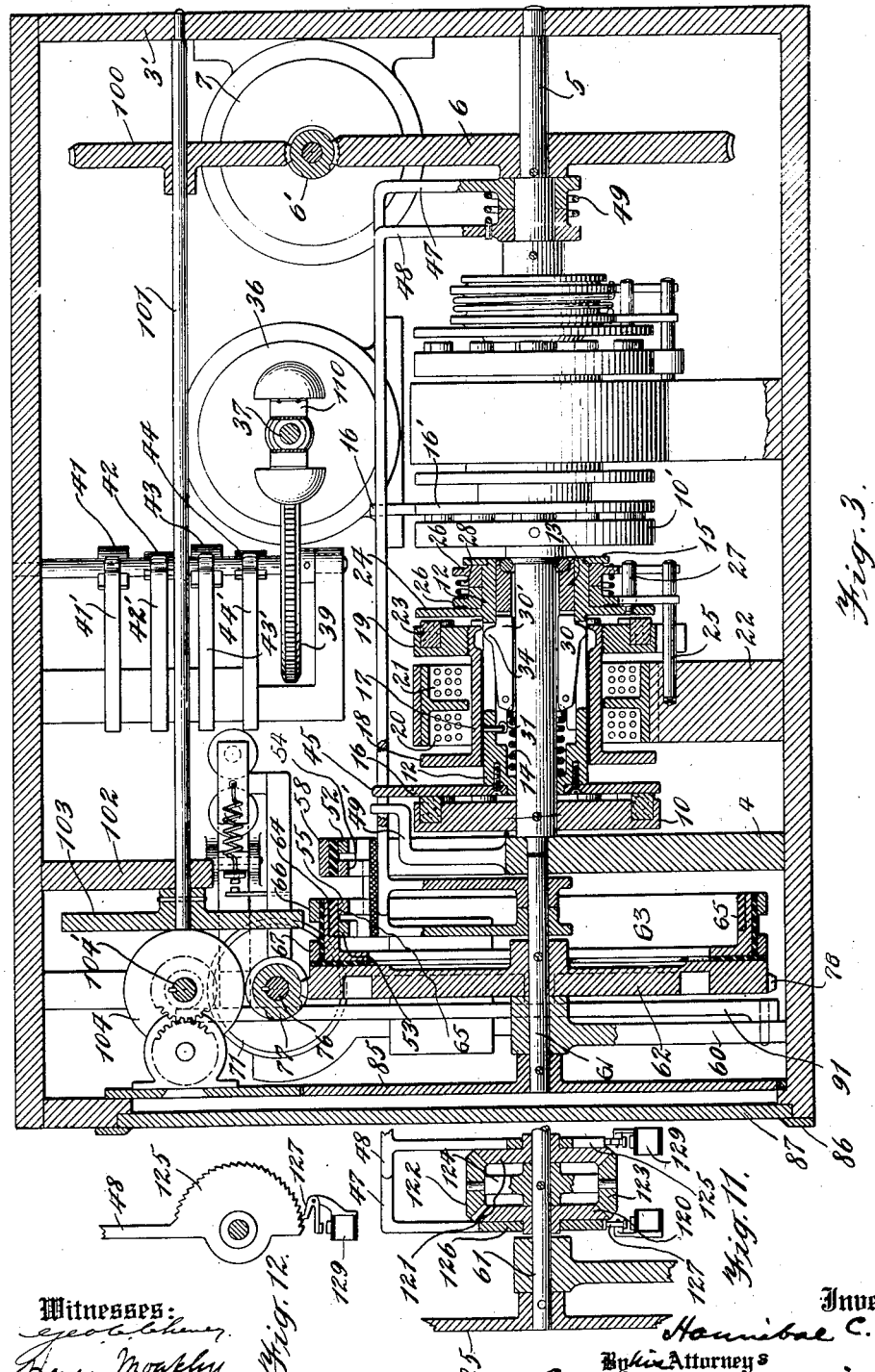

H. C. FORD.
SPEEDOMETER.
APPLICATION FILED JAN. 15, 1916.
1,297,554.
Patented Mar. 18, 1919.
4 SHEETS—SHEET 3.
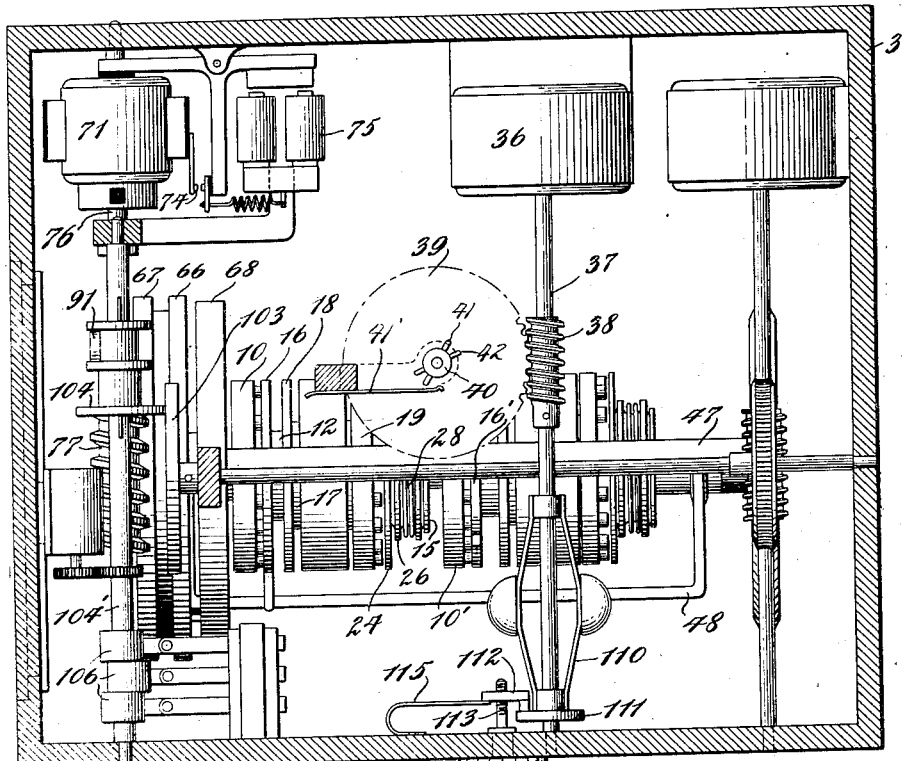

H. C. FORD.
SPEEDOMETER.
APPLICATION FILED JAN. 15, 1916.
1,297,554.
Patented Mar. 18, 1919.
4 SHEETS—SHEET 4.
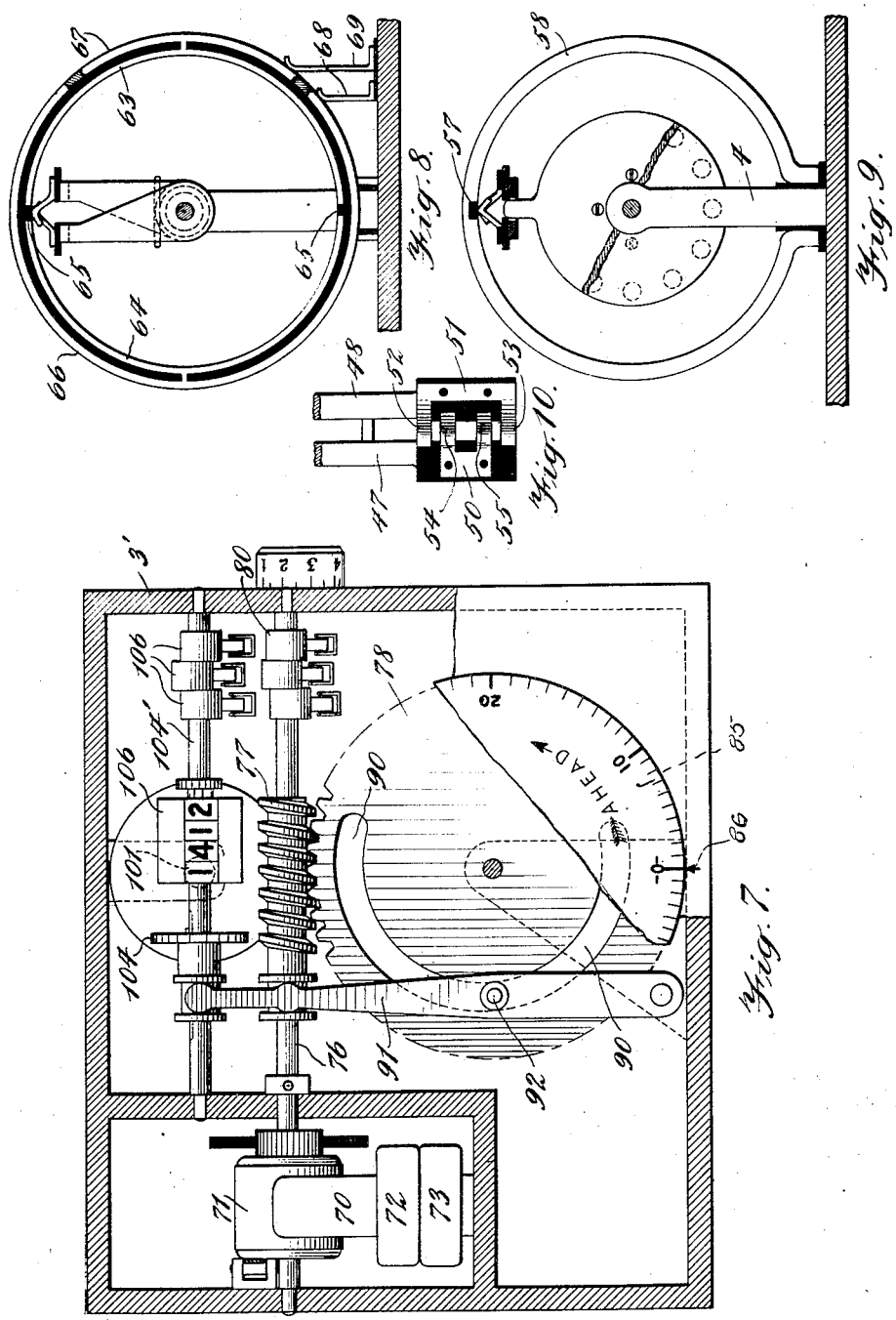

UNITED STATES PATENT OFFICE.

HANNIBAL C. FORD, OF NEW YORK, N. Y., ASSIGNOR, BY MESNE ASSIGNMENTS, TO FORD INSTRUMENT COMPANY, INC., A CORPORATION OF NEW YORK.

SPEEDOMETER.

1,297,554.  Specification of Letters Patent.  Patented Mar. 18, 1919.

Application filed January 15, 1916. Serial No. 72,216.

*To all whom it may concern:*

Be it known that I, HANNIBAL C. FORD, a citizen of the United States, residing at the city of New York, in the borough of Queens and State of New York, have invented certain new and useful Improvements in Speedometers, of which the following is a full, clear, and exact description.

This invention relates to speedometers and has particular reference to devices of the character in which the speed is determined from the magnitude of the angular displacements of an oscillatory speed indicating member.

The general construction of the type of speedometer referred to comprises a single rotatable element adapted to be driven from a constantly rotating part of the speedometer, together with means for periodically establishing a driving connection between the rotating part and the rotatable element for determined time intervals. The constantly rotating part is driven by the rotating member whose speed is to be determined and at a speed directly proportional thereto. Suitable mechanism is also employed for moving the speed indicating member a distance proportional to the angular displacement of the rotatable element.

As the accuracy of the reading obtained depends upon the amount of the angular displacement of the speed indicating member which in turn depends upon the duration of time interval during which the speed indicating member is connected to the rotating part, it has heretofore been impractical to use speedometers operating upon this general principle for indicating the speed of rotating members having wide variations in speed in short intervals of time.

One of the objects of this invention is to provide a speedometer of the character described, which may be used for accurately indicating rapidly varying velocities in the speed of the rotating member. My invention, therefore, contemplates using, instead of one rotatable element, a plurality of them, each of which is adapted to be driven from the constantly rotating part. Means is employed for establishing a driving connection between each of these elements and the rotating part for successive overlapping time intervals. Suitable mechanism is also provided whereby the angular movement of each of the elements will in turn affect a device common to all of them which device controls the speed indicating mechanism. In this manner, after the first reading has been obtained successive readings of the speed at short intervals are possible without changing the long time interval during which each of the rotatable elements is connected to the constantly rotating part; or in other words, without diminishing the accuracy of the instrument.

The invention also contemplates improvements in the details of construction utilized for establishing the driving connection between the constantly rotating part and one or a plurality of rotatable elements.

These phases of the invention are broadly applicable to speed indicators of this character irrespective of the character of the moving part whose speed is to be determined.

Another object of the invention is to provide a speedometer which will give a direct reading of the speed of a moving object propelled by a rotating member where the speed of the moving object is not directly proportional to the speed of the propelling member, but varies therefrom in accordance with a determinable factor. A specific illustration is that of a vessel driven by a propeller shaft since the speed of a vessel varies from the speed of the propeller shaft by the determinable factor which is called the slip of the propeller. Heretofore, in so far as I am aware, it has never been contemplated to provide an instrument in which a speed indicator member, which moves uniformly for unit changes in speed is corrected for a factor such as the slip of the propeller, so that the angular displacement of a speed indicating member is directly proportional to the speed of the ship if other factors causing a variation in the speed, such as the condition of the ship's bottom or the depth to which the ship is submerged, is left out of consideration. In carrying out this object of the invention, I associate with the mechanism for angularly moving the speed indicating member a suitable auxiliary device which also controls the angular displacement of this member to advance or retard it in accordance with the magnitude of the determinable factor.

In the specific embodiment of the invention shown, this is accomplished by using a follow-up mechanism between the rotatable element and the speed indicating member which comprises an electric motor for driving the speed indicating member, and a drum which is also driven by the motor; this drum carries segment contacts with which a brush or brushes carried by the member common to all of the rotatable elements coöperates, so that after the brush has been angularly moved a distance along the rotary segment contact corresponding to the angular displacement of an element, the circuit to the motor is closed and the motor, through its driving connection, will drive the drum the same distance or until the brush and segments are in the same relative position as formerly. The circuit to the motor is then broken. The auxiliary device mentioned also acts on the drum to move it to this position, which device is so constructed as not to interfere with the movement of the drum through its connection with the motor, but only to aid or retard the same. The angular distance through which the drum is moved by this auxiliary means is proportional to the determinable factor, such as the slip of the propeller. The speed indicating member is connected to the motor alone and will therefore be moved an angular distance which is greater or less than the distance through which it would be moved if the auxiliary means were not employed; or in other words, the speed indicating member will be moved a distance corresponding to the speed of the propeller shaft minus the slip of the propeller.

A still further object of the invention is to provide a speedometer which may be utilized to obtain readings where there are other factors which must be taken into account in determining the speed of the moving object, as for example, the condition of the ship's bottom which retards a moving ship. This is accomplished by providing in the means for periodically establishing a driving connection between the rotatable element and the constantly rotating part of the speedometer, means whereby the time interval during which the connection is established may be adjusted. As an angular displacement of the actuating member of the speed indicating mechanism is directly proportional to the time during which the connection is established, this adjustment in the time interval provides a means whereby the extent of the angular displacement of the speed indicating member may be increased or decreased giving a corresponding correction in the reading obtained.

Another object of the invention is to provide a device whereby the total miles covered by the moving object, as a ship, in any determined period of time may be read directly from a cyclometer or other suitable device, which reading is corrected for the determinable factor such as the slip of the propeller. This is accomplished by providing change speed gearing between the constantly rotating part of the speedometer and the cyclometer, which is actuated by the auxiliary device so that the speed of the cyclometer shaft is varied in accordance with the determinable factor of the slip of the propeller.

The invention also contemplates electrically transmitting the angular movement of the speed indicating member to a distant point having a suitable receiving device for giving readings of the speed and for also associating with cyclometer shaft electrical devices whereby a second cyclometer at the distant point may also be similarly actuated.

The invention also consists of the construction and combination of the various elements thereof, as will be set forth in the description and particularly pointed out in the appended claims.

In the accompanying drawings, I have shown one specific embodiment of the invention which is adapted to be used for indicating the speed of a ship, but I do not intend to be limited to this particular use or to the particular structure of the parts, but only by the scope of the appended claims.

Fig. 3 is a vertical longitudinal section of the master indicator, the parts being shown in their normal position;

Fig. 4 is a plan view of the master indicator with the cover of the casing removed, on a reduced scale from that shown in Fig. 3;

Fig. 5 is a central section through one of the rotatable elements, showing the same in its displaced position;

Fig. 6 is an end view of Fig. 5;

Fig. 7 is a front elevation, the front cover and a portion of the speed indicating dial of the master indicator being broken away in order to more clearly show the parts;

Figs. 8, 9 and 10 are details of the electrical means for establishing connections between the brush carried by the member common to the rotatable elements and the servo-motor; and Figs. 11 and 12 are details of a modification.

Figure 1:
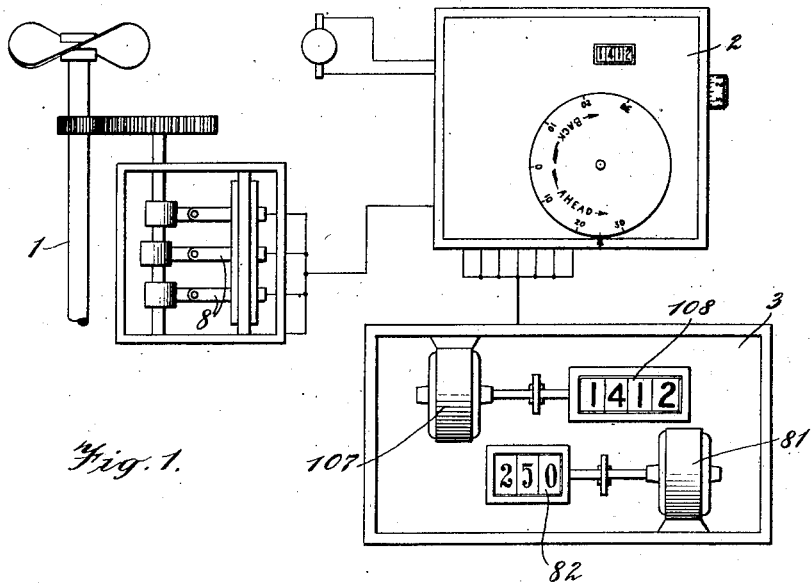
Figure 1 is a diagrammatic view showing the general arrangement of the speedometer and its connections to the propeller shaft of a ship, together with an auxiliary indicator adapted to be disposed at a remote point.

Referring first to Fig. 1, the propeller shaft of the ship whose speed is to be determined is designated 1, the master indicator 2, and the auxiliary indicator at a distant station 3. The mechanism of the master indicator is housed in a suitable rectangular casing 3'. Mounted in suitable bearings provided in an upright 4 and in the wall of the casing 3' is a shaft 5 carrying a worm wheel 6 geared to a worm 6' mounted on the shaft of a motor 7. This motor may be of any type of motor which is adapted to be driven at a synchronous speed to a rotating part and in the embodiment shown is a step-by-step motor which is electrically connected to a transmitter switch 8 geared to the propeller shaft 1 so that the motor 7, and hence its shaft 5, will be driven at a speed directly proportional to the speed of the propeller shaft 1. This shaft 5 corresponds to the part which has heretofore been referred to as "the part of the speedometer which is adapted to be constantly rotated," and will be referred to as such in the remaining description and in the claims.

In the specific embodiment of the invention shown two rotatable elements are illustrated, but a greater number can be provided if desired. The rotatable elements are each of a similar construction and comprise an outer sleeve member 12 and an inner sleeve member 13, which members are normally forced apart longitudinally by means of a spring 14 surrounding the shaft 5 and arranged within an annular chamber provided in the outer sleeve member 12. The inner sleeve member 13 bears against a thrust bearing 15. Secured to the end of the outer sleeve member 12 opposite the thrust bearing 15 is a disk 16 which, through the action of the spring 14, is pressed into engagement with the friction surface of a friction disk 10 mounted on the shaft 5 to rotate therewith. Loosely surrounding the sleeve 12 is an armature sleeve 17 carrying at its ends disk armatures 18 and 19, respectively, which are adapted to be attracted by electro-magnets having coils 20 and 21, respectively, which are mounted upon a suitable support 22 extending upwardly from the bottom of the casing. The disk armature 19 is provided with a friction surface 23 which, when the sleeve is moved in one direction by the attraction of the armature 18 by its corresponding coil 20, is forced into engagement with a disk 24 mounted on the outer sleeve member 12. The armature sleeve 17 is held against rotation by a pin 25 extending laterally from the stationary part 22, which pin fits into a slot in the disk armature 19. When, therefore, the disk 19 is forced into engagement with the disk 24, the sleeve 12 of the rotatable element is also held against rotation. This occurs only so long as the coil 20 remains energized. Mounted upon the outer end of the sleeve member 12 are two annular rings 26 having projecting lugs which are normally maintained in abutment with a pin 27 carried by the disk 24 and the stationary pin 25 by a centralizing spring 28, which spring serves to return the sleeve 12, together with the disk 16, to their normal position.

After the magnet coil 20 is deënergized, it is essential that the disk 16 will be maintained out of engagement with the friction disk 10 a sufficient distance to permit the sleeve 12 to rotate and return to its normal position. This is provided for by the use of a plurality of spring actuated dogs 30 mounted on the inner sleeve member 13 and passing through alining radial slots in both members, which members are maintained against relative rotation by pins 31 carried by the member 12 and having a sliding fit in slots in the member 13. The dogs 30 are provided at their outer ends with shoulders 30' which are engaged by the edge of the slot in the outer sleeve member 12, as will be clear from Fig. 3.

When the coil 20 is energized the armature 18 will be attracted and the disk armature 19 carried by the sleeve 17 forced into engagement with the disk 24, which will move the outer sleeve member 12 a slight distance toward the right, as viewed in Fig. 3, against the action of the spring 14. The shoulders 30' formed upon the dogs 30 will therefore be released from the edge of the radially disposed slot in the sleeve member 12 and the spring actuated dogs will fly outwardly until the outer edge of the dog engages the edge of the wall of the slot in the sleeve member 12, as shown in Fig. 5, in which position it will prevent the return movement of the sleeve member 12 and the disk 16 toward the left until the dogs are returned to their normal position. Mounted upon each of the dogs is a lug 34 which, when the dogs are in their released position fits into radially disposed cam-shaped grooves 35 formed in the sleeve 17. When the coil 21 is energized the sleeve 17 will be moved toward the left and the engagement of the lugs 34 with the cam-shaped grooves 35 will force the dogs inwardly toward the shaft 5 until the edge of the wall of the slot in the sleeve member 12 is released from its engagement with the outer edge of the dog, after which the outer sleeve member 12 and the disk 16 will, under the tension of the spring 14, move toward the left until it occupies its original or normal position; that is, with the disk 16 in engagement with the friction disk 10. It is while the disk 16 is held in its retracted position by the dogs 30 that the sleeve members 12 and 13 and the disk 16 rotate to their normal position under the action of the centralizing spring 28, since the grip between the friction surface 23 and the disk 24 is not sufficient unless the coil 20 is energized to prevent this movement.

Figure 2:
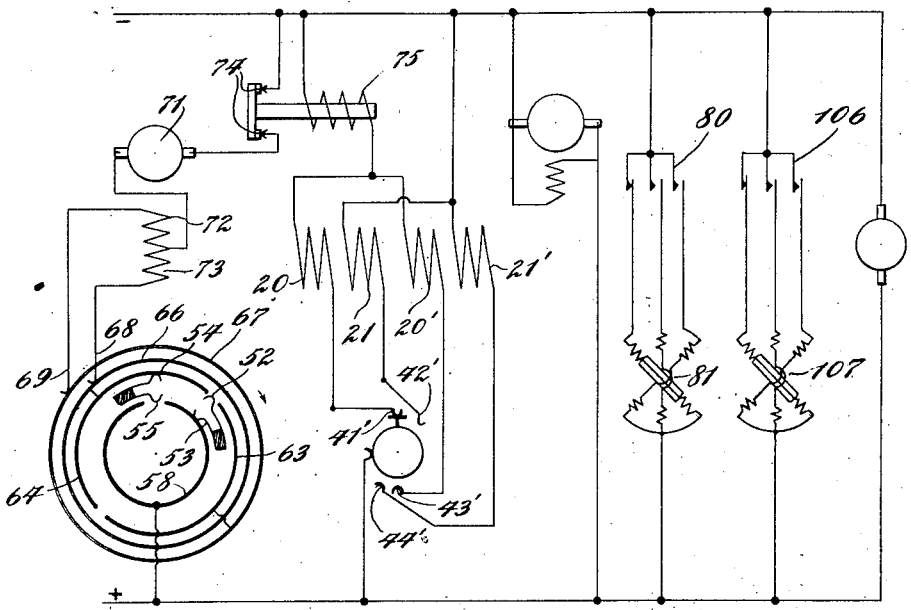
Fig. 2 is a diagrammatic view of the electrical circuits employed.

The energization of the coils 20 and 21 is controlled by a constant speed motor 36 which drives a shaft 37 connected by a worm 38 and worm wheel 39 to a transmitter shaft 40 carrying a series of transmitter switches consisting of contacts 41, 42, 43 and 44, which engage spring contact blades 41', 42', 43' and 44', respectively. Two of the contact blades, namely, 41' and 42' are connected to the electromagnets 20 and 21 which control the disk 16 and associated parts, while the other two contact blades are connected to the coils 20' and 21' which control the disk 16' and associated parts, as shown in Fig. 2.

The disks 16 and 16' are each provided with lugs 45 and 46, respectively, which engage two U-shaped bails 47 and 48, having suitable bearings at their end by means of which they are loosely mounted concentric with the shaft 5. These bails are connected together at one end by a centralizing spring 49 which normally tends to return them to their normal position against a stop or pin 49', or that shown in Figs. 3 and 8 of the drawings. The bail 47 carries a double contact brush 50 which is insulated therefrom, while the bail 48 carries a similar brush 51, the blades of the brush 51 being designated 52 and 53 and the blades of the brush 50, 54 and 55 (see Fig. 10). The blades 52 and 54 in the normal position of the bails rest upon an insulated insert 57 provided in a stationary annular contact ring 58, which is disposed in vertical alinement with the standard 4, the ends of the ring being bent at their lower ends and engaged by said standard, but is insulated therefrom. (See Fig. 9.)

Mounted in bearings formed in the standard 4 and a second upright 60 is a shaft 61 arranged in vertical alinement with the shaft 5. This shaft acts as a support for the ends of the bails 47 and 48, which carry the brushes, and also has rigidly mounted thereon a disk 62 which carries two rotary contact segments 63 and 64, respectively, each extending substantially throughout a semicircle and being insulated from each other at their adjoining ends by the insulated inserts 65 (see Fig. 8). Each of the brushes 53 and 55 are adapted to contact with these two rotary contact segments. The segment 64 is electrically connected with a slip ring 66 and the segment 63 with a slip ring 67, which are respectively engaged by contact brushes 68 and 69. Mounted in the casing 3' and preferably in a separate compartment therein is a servo-motor 70 having an armature 71 and two field coils 72 and 73, respectively. The contact 68 is connected in circuit with the field coil 73 and the contact 69 is connected in circuit with the coil 72, the coils being wound so that when current is passed therethrough they will rotate the armature 71 in opposite directions. The circuit passing from armature 71 leads to contacts 74 controlled by an electromagnet 75, which is included in the same circuit as the coils 20 and 20', so that the motor 70 will be energized only while these coils are energized.

The shaft 76 of the armature 71 carries a worm wheel 77 which engages with a suitable worm wheel 78 formed upon the disk 70 62, which carries the rotary contact segments. The shaft 76 also carries a plurality of transmitter switches 80 whereby electrical impulses are imparted to a step-by-step motor 81 in the auxiliary indicator 3. This motor drives the suitable revolution counter 82 whereby an indication of the speed may be given at this point. If desired, a revolution counter positioned within the master indicator 2 could be used which would be driven directly for the shaft 76. The shaft 61 which carries the worm wheel 78 and rotary contact segments also has rigidly mounted on its end a dial 85 which is graduated to indicate the speed by the angular displacement thereof, the scale coöperating with a stationary pointer 86 carried by the front of the casing, at which point the value of the speed at the instant may be read. The dial is placed behind glass front 87 in the casing so that it may be exposed to view at all times.

The construction of the speedometer thus far described is sufficient where the speedometer is to be utilized for determining values of speed which are proportional to the rotating member driving the constantly rotating part of the speedometer; or in other words, the structure described is sufficient unless it is desired to determine the speed of the moving object which varies by a predetermined amount from the proportionate speed of its propelling member. Its operation will therefore be described before taking up the other features of the invention.

Assuming that the bail 48 which carries the brushes 52 and 53 has been moved to its full line position shown at the left hand end of Fig. 2; that is, has been displaced angularly from its normal position by the locking of the rotatable element to the rotating shaft 5 for a determined period of time. Assuming also that the transmitter switches are in the position shown in Fig. 2, at the end of this determined period of time, it being understood that while a single switch is shown in this diagrammatic view instead of the series of contacts 41, 42, 43 and 44, nevertheless, the action of this single contact will be similar and such a construction could be substituted for the series of contacts and their blades shown. Contact is then closed through contact blade 41' which will energize the magnet coil 20 and also the electromagnet 75 which is in circuit therewith, the coil 75 when energized closing the contact 74 and the circuit to the servo-motor whose armature is designated 71. Assuming furthermore that the drum 62 has not yet been rotated and that the segments 63 and 64 are in their normal position; that is, a position in which the gaps between the two segments are vertically disposed. The brushes 53 and 52 will therefore close the contact through the annular contact ring 58 and segment 63 which is connected to slip ring 67 and the circuit will be continued through brush 69, field winding 72 of the motor, armature 71, contacts 74 to the other side of the line. As will be clear from Fig. 4, the contact 41, since the shaft 40 which carries the same is being slowly rotated, maintains this circuit closed for a short period of time. While the coil 20 is energized, the stationary friction surface 23 is held against the disk 24 carried by the rotatable element, which construction will hold the bail 48 and the brushes 53 and 52 in their moved position against the tendency of the centralizing spring 49 to return them to their normal position. The circuit through the servo-motor 70 being closed during this period through its field winding 72, the motor will through the worm 77 and wheel 78 rotate the rotary contact segments 63 and 64 in the direction of the arrow shown in Fig. 2 until the brush 52 is opposite the gap between the two segments at which point the circuit through the motor will be broken. During this time, the motor will have rotated an angular distance proportional to the angular displacement of the bail or brushes 52 and 53. The rotation of shaft 76 also actuates the transmitter 80 to move the step-by-step motor 81 actuating the indicator 82 a proportionate angular distance.

After the circuit to the servo-motor 70 is broken at the rotary segment contacts, the contact 41 passes from beneath the blade 41' deënergizing the magnet coil 20. Until this has occurred the disk 16 and brushes 52 and 53 are locked against rotation. After the deënergization of the coil 20, the spring dogs 30 hold the disk 16 out of engagement with the friction disk 10, but permit these parts to rotate back at their normal position under the action of the centralizing spring 49. When contact 42 engages contact 42', the coil 21 is energized which as described releases the spring dogs 30 and permits the disk to again engage the friction disk 10 under the action of the spring 14.

Assuming also that the rotatable element including the disk 16' has been in engagement with the friction disk 10' for the determined time interval when the contact 42 reaches the contact 42', but that during this time interval the speed of the vessel has been increased so that the lug 46 instead of carrying the brushes 53 and 52 to the position shown in full lines in Fig. 2, carry them to a position in advance thereof. The circuit through the coil 20' will be closed. The rotatable element will be held stationary by energization of the coil 20' in the same manner as previously described, and the circuit to the servo-motor 70 will be closed through the rotary contact segment 63, slip ring 67, brush 69, field winding 72, armature 71 and contact 74, etc., which will energize the motor and drive the same in the direction of the arrow as shown in Fig. 2 until one of the gaps between the two rotary contact segments again is opposite the brush 52 at which point the circuit to the servo-motor 70 will be broken. Shortly thereafter, the circuit through the coil 20' will also be broken. During the driving of the drum carrying the rotary contact segments 63 and 64 to the position described, the transmitter switch 80 will also be actuated to move the shaft 76 and the indicator 82 to a position in advance of the position of the brushes as shown in Fig. 2, or in other words, in advance a distance proportional to the increase in speed.

Assuming that the speed of the rotating member whose speed is to be determined during the time interval in which the disk 16' is engaged with the disk 10', is less than the speed during the equal time interval during which the disk 16 is in engagement with its disk 10, the brushes 53 and 52 instead of being moved the same angular distance will be moved a smaller angular distance. The bail 48 under the action of its centralizing spring will move toward its normal position after the coil 20 has been deënergized until it strikes the lugs on the disk 16'. The circuit to the servo-motor 70 will then be closed instead of through rotary segments 63, through the rotary segment 64 which is connected to slip ring 66, brush 68 and field winding 73 of the motor which will rotate the drum carrying the rotary contact segments in the opposite direction to the arrow as shown in Fig. 2 until the brush 52 again is opposite the gap between the rotary contact segments. The shaft 76 and transmitter switches 80 being rotated in the opposite direction will, instead of advancing the step-by-step motor 81, also rotate it in the opposite direction so that the reading of the speed at the indicator 82 will be less than that previously shown; that is, will be decreased by a reading proportional to the decrease in speed of the rotating part 5.

After contact 43 passes out of engagement with contact blade 43', the disk 16' and other parts of the rotatable element are free to return to their normal position and upon the closing of the circuit through contacts 44 and 44', the energization of coil 21 will release the dogs and the rotatable element will again be clutched to the rotating shaft 5. It will be noted that the blades 41' and 43' are disposed at practically diametrically opposed points and that the time interval during which the rotatable elements are connected to the constantly rotating shaft, is the time interval consumed in the transmitter shaft making ⅜ of a revolution. By this disposition of the contacts, a reading will be obtained for time intervals equivalent to a half revolution of the shaft; or in other words, two independent readings will be obtained in a given time interval where one was heretofore possible. By increasing the number of rotatable elements, the number of readings in a given time interval may be increased indefinitely. The mechanism described comprising the servo-motor, the rotary contact segments, brushes, etc., will hereinafter be referred to as a follow-up mechanism since from the description, it is evident that the angular displacement of the shaft 76 or the member of the speed indicating mechanism, is always equal to the successive angular displacements of the rotatable elements for the given time interval during which they are clutched to the rotating shaft, or in other words, the motor will drive its shaft 76 through angular distances directly proportional to the angular distances through which the bail 48 is driven by each of the rotatable elements.

For rotation of the shaft 5 in the opposite direction, the bail 47 and its brushes 54 and 55 are utilized the operation being identical with that previously described. While one bail and one set of brushes would be sufficient, it has been deemed preferable in the practical construction of the device, to use the two bails and sets of brushes illustrated, since by so doing the return of the bail to their normal position is facilitated. While the shaft is rotating in one direction, the brushes of the other bail which remains in its normal position, receive no current since one of the brushes always remains on the insulating segment in the contact ring 58. This will be clear from Fig. 6.

As stated, the construction of the speedometer as so far described, is only adaptable where the speed of its rotating part is proportional to the speed to be determined, or the construction is inadequate where the speed of a moving object is to be determined, which varies from a speed proportionate to the speed of its rotating propelling member by a determinable factor, such as the slip of the propeller.

The scale upon the dial 85 where the speedometer is to be used for ships and like moving objects, is graduated not uniformly as it would where the speed of the rotating member is directly proportional to the speed of the constantly rotating part of the speedometer, but in a manner so that the graduations increase in length as they increase in numerical value. This necessitated by the fact that when the slip of the propeller is taken into account in giving a speed indication, the angular distance through which the rotatable elements must be driven by the rotating part or shaft 5 at the higher speed in a predetermined time interval to represent equal changes in speed, is greater than it is at the lower speeds. In so far as the construction of the master indicator is concerned, this may be taken care of by the unequally spaced divisions upon the dial, but where an indication is to be given at a distant point as at the auxiliary indicator 3, it is difficult to transmit unequally-spaced divisions to the same, since by so doing, it would be impossible to use a step-by-step motor, or any of the standard types of apparatus for rotating a part uniformly. It is therefore necessary to impart to the shaft 76 an angular displacement which will be proportional to the actual speed of the moving object; that is, an angular displacement which will be greater or less in proportion to the angular displacement of a rotatable element. This is accomplished by the use of the following construction.

A cam-groove or track 90 is cut in the face of the disk 62, which cam-groove is determined by the curve of factor by which the speed of the moving object differs from a speed proportionate to the speed of its propelling member. In the form shown the cam is determined by the slip of the propeller. Pivoted to the standard or upright 60 adjacent its lower end, is a lever 91 having a roller 92 extending laterally therefrom which is adapted to slide within the cam-groove 90. The worm 77 while being constrained to rotate with the shaft 76, is adapted to slide longitudinally thereon and is provided at one end with two spaced flanges between which the arm of the lever 91 fits so that when the lever 91 is rocked by the engagement of the roller 92 in the cam track, the worm 77 will be displaced longitudinally along the shaft 76. As is well known, the slip of a propeller increases with the speed of the vessel for which reason the cam is curved as shown with its distance from the peripheral edge of the disk increasing so that as the disk is rotated in a clockwise direction from its zero speed position, as viewed in Fig. 7 the lever 91 will be moved in increasing amounts for equal angular displacements of the cam in a direction to displace the worm 77 toward the right as viewed in Fig. 7.

Assuming now that the rotatable element and the brushes have been moved to a position proportional to the speed of the rotating part of the speedometer and the connections to the servo-motor of the follow-up mechanism have been closed to rotate the rotary contact segments a distance corresponding thereto, the rotary contact segments, as well as being rotated by the rotation of the worm 77, will also be rotated by the rectilinear movement of the worm along its shaft 76 caused by the lever 91 and cam groove, the worm serving as a sliding rack. Therefore to angularly displace the rotary contact segments a distance proportional to the constantly rotating part, the shaft 76 need not be rotated a distance which is directly proportional to the angular displacement of the rotatable element, but only through an angular distance which is less than the same. By the correct determination of the cam-groove, the angular displacement of the shaft 76 may therefore be made directly proportional to the speed of the ship. In the same manner, if the ship is moved backward and the shaft 5 is being driven in the opposite direction, the upper half of the cam-groove 90 is so disposed so that the lever 91 will be moved toward the left which will also aid in moving the rotary contact segments through an angular distance proportional to the speed of the shaft 5, and the angular displacement of the shaft 76, will, as before, be directly proportional to the speed of the ship. In so far as I am aware, this feature of the invention is broadly new with me, and it is not my intention to limit its use to the particular construction shown, or to a construction in which a plurality of rotatable elements are used, as it is obvious that one rotatable element could be connected to a device of this character if the speed of the moving object did not vary to any considerable extent in small intervals of time.

Another feature of the invention is a construction which permits the miles covered by a moving object in any period of time, to be directly read both at the master station and at the auxiliary indicators; that is, the distance covered by the moving object corrected for the slip of the propeller or any other determinable factor.

Referring to Fig. 3, the motor 7 which drives the shaft 5 through the worm wheel 6 also drives a second worm wheel 100 disposed above the motor and mounted upon a shaft 101 extending longitudinally through the casing and supported in bearings in the casing 3 and a suitable standard 102 depending from the top of the casing. The shaft 101 is therefore driven at a speed directly proportional to the speed of the rotating member; that is, the propeller shaft 1 and also to the constantly rotating part or the shaft 5. Mounted at the other end of the shaft 101 is a friction disk 103. A friction disk 104 slidable longitudinally upon a shaft 104' arranged parallel to and above the shaft 76 has its peripheral edge in rolling contact with the disk 103. The friction disk 104 is, similar to the worm 77, provided with a sleeve having flanges through which the lever 91 extends so that the friction disk 104 may be moved toward and away from the center of the friction disk 103 by the movement of the lever 91. These two disks therefore constitute change speed gearing so that the shaft 104' instead of being driven at a speed directly proportional to the speed of the rotating member 1, or the constantly rotating part 5, is driven at a speed which differs therefrom in accordance with the amount which the friction disk is moved toward or away from the center of the friction disk 103 by the lever 91. The difference in speed of the shafts 104' and 101 is such that the speed or angular displacement of the shaft 104' during a determined time interval is equal to the speed of the rotating part 5 minus an amount equal to the determinable factor or the slip of the propeller. The angular displacement of the shaft 104' is therefore directly proportional to the speed of the moving object. This shaft is utilized to actuate a cyclometer disposed at the master indicator from which direct readings of the distance covered by the ship in a predetermined time may be determined. The shaft 104' is also utilized to drive a series or set of transmitter switches 106 whereby electrical impulses may be transmitted to a step-by-step motor 107 in the auxiliary indicator 3 to actuate a second cyclometer 108 whereby the distance covered by the ship may also be read at this point.

In some instances, it is also desirable to take in consideration in determining the speed of a moving object other factors which bear a determinable ratio to the speed of the moving object; i. e. the factor increases with the speed and may have an accelerating or retarding effect on the moving object. In the example of a ship two such factors are the conditions of the ship's bottom and the depth to which it is submerged, each of which factors have a retarding effect on the speed of the ship.

As stated, my invention also contemplates providing means whereby these factors may be taken into account and an accurate direct reading of the speed of the ship obtained. This is accomplished by changing the time element during which the connection between the rotating elements and the constantly rotating part is established.

Referring to Fig. 4, it will be seen that the shaft 37 which drives the timing mechanism or transmitter switches 41 and 42, etc., is extended through the casing and carries at its other end a governor 110 carrying a brake disk 111 which is adapted to contact with a fixed part 112 carried by the casing. The fixed part 112 is mounted upon a screw 113 adapted to be actuated by a thumb wheel 114 mounted exteriorly of the casing, and is held to the limit of its adjustment by a spring 115. It will therefore be evident that by rotating the thumb wheel 114, the fixed part 112 may be moved toward or away from the governor and in this way the speed of the rotating shaft 107 changed so that the transmitter shaft 40 may be constrained to rotate at any desired speed, the thumb wheel 114 being graduated so that it may be set at any desired time interval. As is evident, the angular displacement of the actuating member of the indicator or the shaft 76 is directly proportional to the length of the time interval during which the connection is established between the rotatable element and the constantly rotating part; or in other words, is directly proportional to the angular displacement of the rotatable element since the follow-up mechanism, which connects the shaft 76 and the rotatable elements, is expressly designed so that this will be true. If, therefore, the time interval during which the connection is established between the rotatable element and the constantly rotating part or the shaft 5 is varied, it will give a reading of the speed, which is corrected for determinable factors influencing the speed of the moving object in determinable amounts.

It should be obvious that if the speedometer is to be used with moving objects where it is unnecessary to correct the reading for some factor, which, while bearing a definite relation to the speed, is not a simple ratio of the speed as in the case of the slip of the propeller, then the brushes carried by the bails, the coöperating drum, the servo-motor and other parts of the follow-up device may be eliminated and the bails utilized to move the movable speed indicating member. In such a case, the modification of the speedometer shown in the detail views designated Figs. 11 and 12 may be employed. The support or standard 60 carries a shaft 61 to which the indicator dial 85 is attached in the manner shown in Fig. 3. Differential gearing connects the two bails to the speed indicating member, and in the specific construction shown, the bail 47 is secured at one end to a gear 120 and in the similar manner the bail 48 is secured to a gear 121, which gears are loosely mounted on the shaft 61. These two gears coöperate with gears 122 and 123 carried by a frame piece 124, which is fastened to the shaft 61. Each of the bails is also provided with a ratchet wheel which, as shown in Fig. 12, is a segmental wheel since each bail is only adapted to move through an angle of 180°. These ratchet wheels have been designated 125 and 126 respectively. Spring actuated pawls 127 and 128 engage the ratchet wheels to normally hold the bails in any angular position to which it is moved against the tension of the equalizing spring 49. These pawls are controlled by electromagnets 128 and 129 which magnets should be substituted in the circuit of the coils 20 and 20' in place of the relay 75, which controls the servo-motor so that each time the coils 20 and 20' are energized to release the rotatable element in order to permit it to return to its normal position, the pawls will be withdrawn from the ratchet wheels in order to permit the bails to follow these elements and return to their normal position. In the operation of this type of instrument, the angular movement is imparted to the bails 47 and 48 as before described and when either of these bails is angularly moved, it will, through the differential gear described, rotate the shaft 61 through one-half the distance it would if the bail were directly attached to the shaft. The movement of the bails 47 and 48 in opposite directions will impart to the dial 85 also movement in opposite directions and the speed of the moving object may therefore be read directly off the scale 85. This type of instrument is much simpler in its conception than the one previously described, but in it no provision is made for compensating for the slip of the propeller, although other conditions affecting the speed of the moving objects where the conditions bear a simple ratio to the speed, a corrected reading may be obtained by varying the time interval during which the driving connection between the rotatable elements and the shaft is established as before described.

Another feature of the invention resides in the fact that in the type of speedometer shown, the shaft or parts connected to the bails 47 and 48 which are the members controlled by the movable rotatable elements whose driving connections are periodically established may be utilized to perform external work since the bails or the equivalents when moved through the rotatable elements have the same capacity for doing work as would the shaft 5. These members may therefore be used to actuate some device which, while not indicating speed upon a scale, is necessarily moved an amount which is proportional to the speed of the part to which the rotatable elements are connected; or in other words, instead of utilizing the movable member or members controlled by the rotatable elements to drive speed indicating mechanism, these members may be used to drive other mechanisms upon which no direct reading of the speed is given. It is therefore my intention not to limit the invention to the specific application to speedometers, since the features of construction are broadly applicable to devices which in their operation is similar to speedometers, while not giving a direct reading of the speed.

I claim:

1. In a speedometer, a rotary part adapted to be constantly rotated, a plurality of rotatable elements adapted to be driven therefrom, time-controlled means for periodically and successively establishing driving connections between said part and each of said elements, an angularly movable member operable by each of said elements, a speed indicating device having a part for indicating speed in accordance with the angular movement thereof, and an electrically controlled means for advancing the part of said speed indicating device in proportion to the angular movement of said member.

2. In a speedometer, a rotary part adapted to be constantly rotated, a rotatable element adapted to be driven therefrom, time-controlled means for periodically establishing a driving connection between said part and said element, a speed indicating device having a part movable through an angular distance for indicating speed, and means connecting said speed indicating part to said rotatable element for positively moving said speed-indicating part in either direction to a position corresponding to the position of said rotatable element.

3. In a speedometer, a rotary part adapted to be constantly rotated, a rotatable element adapted to be driven therefrom, time-controlled means for periodically establishing a driving connection between said part and said element, a speed indicating device having a speed indicating member movable through an angular distance for indicating speed, and electrically controlled means connecting said speed indicating member to said rotatable element for moving said speed-indicating member to a position corresponding to the position of said rotatable element.

4. In a speedometer, a rotary part adapted to be constantly rotating, a plurality of rotatable elements adapted to be driven therefrom, time-controlled means for periodically and successively establishing a driving connection between said part and each of said elements, an angularly movable member operable by each of said elements, a speed indicating device having a part movable through an angular distance proportional to the speed, and means connecting said member to said last mentioned part for positively moving said last named part to a position corresponding to the position of said angularly movable member.

5. In a speedometer, a rotary part adapted to be constantly rotating, a plurality of rotatable elements adapted to be driven therefrom, time-controlled means for periodically and successively establishing a driving connection between said part and each of said elements, an angularly movable member operable by each of said elements, a speed indicating device having a part movable through an angular distance proportional to the speed, and electrically controlled means connecting said member to said last named part for moving said last named part to a position corresponding to the position of said angularly movable member.

6. In a speedometer, a rotary part adapted to be constantly rotated, a rotatable element adapted to be driven therefrom, time-controlled means for periodically establishing a driving connection between said part and said element, an angularly movable member operable by said element, a reversible electric motor having two circuits passing therethrough for rotating the motor in opposite directions, a disk carrying pair of rotary segment contacts, one connected to each of said circuits, a movable brush actuated by said member co-acting with said contacts, and a driving connection between said motor and said drum.

7. In a speedometer, a rotary part adapted to be constantly rotated, a plurality of rotatable elements adapted to be driven therefrom, time-controlled means for periodically and successively establishing a driving connection between said part and each of said elements, an angularly movable member operable by each of said elements, a reversible electric motor having two circuits passing therethrough for rotating the motor in opposite directions, a disk carrying pair of rotary segment contacts, one connected to each of said circuits, a movable brush actuated by said member co-acting with said contacts, and a driving connection between said motor and said drum.

8. In a speedometer, a rotary part adapted to be constantly rotated, a rotatable element adapted to be driven therefrom, time-controlled means for periodically establishing a driving connection between said part and said element, an angularly movable member operable by said element, speed indicating means having an angularly movable part, a follow-up mechanism connecting said last named member and part comprising a reversible electric motor, a rotary contact device driven therefrom, a brush carried by said angularly movable member co-acting with said device, circuits connected with said rotary contact device for rotating the motor in opposite directions, and a driving connection between said motor and movable part of the speed indicating means.

9. In a speedometer, a rotary part adapted to be constantly rotated, a rotatable element adapted to be driven therefrom, time-controlled means for periodically establishing a driving connection between said part and said element, an angularly movable member operable by said element, a reversible electric motor, a speed indicating member driven therefrom, and circuit connections controlled by said angularly movable member for rotating said motor to change the position of said speed indicating member in proportion to changes in the angular position of said angularly movable member.

10. In a speedometer, a part adapted to be constantly rotated, a rotatable element adapted to be driven therefrom, an electrically controlled means for connecting said rotatable member to said part when energized and electrically-controlled means for disconnecting said rotatable member from said part when energized, and time-controlled means for controlling the energizations of said electrically controlled means.

11. In a speedometer, a part adapted to be constantly rotated, a rotatable element adapted to be driven therefrom, a clutch mechanism for connecting said rotatable member to said part, separate time-controlled electromagnetic devices for actuating said clutch mechanism to connect and disconnect said member from said part when energized.

12. In a speedometer, a shaft adapted to be constantly rotated, a sleeve loosely mounted thereon having a limited movement in a longitudinal direction, a friction clutch connected to said sleeve for normally locking said sleeve to said rotatable shaft, spring actuated dogs for maintaining said friction clutch open after a longtitudinal displacement of said shaft in one direction, electro-magnetic means for displacing said shaft in said direction, electromagnetic means for releasing said dogs to permit said sleeve to return to its normal position, and time-controlled means for energizing said electromagnetic means.

13. In a speedometer, a shaft adapted to be constantly rotated, a plurality of rotatable elements loosely mounted on said shaft, biased to a normal position and having projections thereon normally in alinement, a bail common to all of said elements loosely mounted on said shaft and biased to a normal position in which each of said projections abut thereagainst, and means for periodically and successively locking each of said rotatable elements to said shaft for overlapping time intervals, and means for disconnecting them from said shaft for other time intervals during which said elements return to their normal position.

14. In a speedometer for ships, a part driven from the propeller shaft of the ship, a rotatable element adapted to be driven therefrom, time controlled means for periodically establishing a driving connection between said part and said element for a definite time interval and means for adjusting the time interval during which the connection is established in accordance with factors which cause a variation in the speed of the ship.

15. In a speedometer, a part adapted to be constantly rotated, a rotatable element adapted to be driven therefrom, time-controlled means for periodically establishing a driving connection between said part and element for a definite time interval, and means for adjusting at will the time interval during which the connection is established.

16. In a speedometer for ships, a part adapted to be constantly rotated, driven by the propeller shaft, a rotatable element adapted to be driven therefrom, electrically-controlled means for connecting and disconnecting said rotatable element to and from said part, separate circuits for said electrically-controlled means, and a rotary switch having contacts adapted to momentarily energize said electrically-controlled means for connecting and thereafter disconnecting it from said rotatable element, means for rotating said switch, and means operable at will for adjusting the speed of the rotation of said switch.

17. In a speedometer, a part adapted to be constantly rotated, speed indicating mechanism having a speed indicating part adapted to indicate unit changes in speed by unit changes in angular displacement, means for periodically establishing a driving connection between said parts whereby said speed indicating part is angularly displaced directly proportional to the speed of the constantly rotating part and additional means for automatically displacing said speed indicating part an additional angular distance which varies with the speed of the constantly rotating part.

18. In a speedometer, a part adapted to be constantly rotated, speed indicating mechanism having a speed-indicating part adapted to indicate unit changes in speed by uniform changes in its angular displacement, and means associated with said parts for displacing said speed indicating part an angular distance proportional to the angular distance covered by said first named part in a determined time interval, and additional means for automatically varying the angular displacement of said speed indicating part in accordance with a determinable factor which varies with the speed of the first named part.

19. In a speedometer, a part adapted to be constantly rotated, speed indicating mechanism having a speed indicating part indicating unit changes in speed by uniform changes in its angular displacement, a rotatable element adapted to be driven from said first named part, time-controlled means for periodically establishing a driving connection between said first named part and rotatable element having determined time intervals, mechanism associated with said rotatable element for driving said second named part an angular distance corresponding to the angular distance covered by said rotatable element in said determined time interval, and means associated with said mechanism for automatically varying the angular displacement of said second named part in accordance with a determinable factor which varies with the speed of said first named part.

20. In a speedometer, a part adapted to be constantly rotated, speed indicating mechanism having a part adapted to indicate unit changes in speed by uniform changes in its angular displacement, a rotatable element associated with said first named part and adapted to be driven therefrom, time-controlled means for periodically establishing a driving connection between said rotatable element and first named part, a mechanism connecting said rotatable element and second named part, said mechanism comprising a reversible motor having separate circuits therefor, a disk carrying a pair of rotary segment contacts one connected to each of said circuits, a movable brush actuated by said rotatable element co-acting with said contacts, a driving connection between said motor and disk, and means associated with said last named driving connection for also rotating said disk independently of the rotation it receives from said driving connection.

21. In a speedometer, a part adapted to be constantly rotated, speed indicating mechanism having a part adapted to indicate unit changes in speed by uniform changes in its angular displacement, a rotatable element associated with said first named part and adapted to be driven therefrom, time-controlled means for periodically establishing a driving connection between said rotatable element and first named part, a mechanism connecting said rotatable element and second named part, said mechanism comprising a reversible motor having separate circuits therefor, a disk carrying a pair of rotary segment contacts one connected to each of said circuits, a movable brush actuated by said rotatable element co-acting with said contacts, a driving connection between said motor and disk, said driving connection comprising a sliding worm driven from said motor and a worm wheel connected to said disk, a cam carried by said disk, and means associated with said cam for sliding said worm longitudinally upon its shaft to also rotate said drum.

22. In combination with a moving object having a speed which varies from the speed of its rotary propelling member, speed indicating mechanism having an angularly displaceable speed indicating part, means for periodically driving said speed indicating part from said first named part for determining a time interval and additional means for automatically varying the angular displacement of said speed indicating part in accordance with the slip between the moving object and its propelling member.

23. In combination with a moving object whose speed varies from the speed of its propelling member, a speed indicating part and means for displacing said part an angular distance proportional to the speed of the propelling member, which mechanism comprises a cam for varying the displacement of said indicating part.

24. In combination with a moving object whose speed varies from the speed of its propelling member, an angularly displaceable speed indicating part, means for connecting said speed indicating part to said propelling member whereby its angular displacement is directly proportional to the speed of said propelling member, and additional means acting on said speed indicating part for further displacing it different amounts when angularly displaced by said propelling member.

25. In combination with a moving object whose speed varies from the speed of its propelling member, an instrument for determining the distance covered by said moving object comprising a rotating part driven by the propelling member, distance indicating mechanism, a variable speed mechanism interposed between said rotating part and said distance indicating mechanism, mechanism for measuring the instantaneous speed of said moving object having an angularly displaceable speed measuring part, means for displacing said speed measuring part directly proportional to the speed of the propelling member, additional means for automatically displacing said speed measuring part in accordance with the difference in the speed of the moving object and its propelling member, and connections from said speed measuring part to the speed varying element of said variable speed mechanism.

26. In combination with a moving object having a speed which varies from the speed of its rotary propelling member, an instrument for determining the distance covered by the moving object comprising a rotating part driven at a speed directly proportional to the speed of said rotating member, distance indicating mechanism having an angular movable part moving through uniform distances to indicate unit distances covered by the moving object, change speed gearing connecting said first named part to said second named part, and means for automatically actuating said change speed gearing upon a change in speed of the rotary member.

27. In combination with a moving object having a speed which varies from the speed of its rotary propelling member, an instrument for determining a distance covered by the moving object comprising a rotating part driven at a speed directly proportional to the speed of said propelling member, distance indicating mechanism having an angular movable part moving through uniform distances to indicate unit distances covered by the moving object, change-speed gearing connecting said first named part to said second named part, a rotatable element adapted to be driven from said first named part, means for periodically establishing a driving connection between said first named part and said rotatable element for determined time intervals, mechanism associated with said rotatable element having a member movable through angular distances greater or less than the angular displacement of said rotatable element, and means associated with said last named member for actuating said change speed gearing.

28. In combination with a moving object having a speed which varies from the speed of its rotary propelling member, an instrument for determining the distance covered by the moving object comprising a rotating part driven at a speed directly proportional to the speed of said propelling member, distance indicating mechanism having an angular movable part moving through uniform distances to indicate unit distances covered by the moving object, change-speed gearing connecting said first named part to said second named part, a rotatable element adapted to be driven from said first named part, means for periodically establishing a driving connection between said first named part and said rotatable element for determined time intervals, means associated with said rotatable element including a disk having an angular movement equal to the angular movement of said rotatable element, a cam carried by said disk, and means associated with said cam for actuating said change speed gearing.

29. In combination, a rotary part, a rotatable element adapted to be driven therefrom, time-controlled means for periodically establishing a driving connection between said part and said element, a device having an angularly movable member and electrically-controlled means connecting said member to said rotatable element for moving said angularly movable member to a position corresponding to the position of said rotatable element.

30. In combination, a rotary part, a rotatable element adapted to be driven therefrom, separate electrically-controlled devices for connecting and disconnecting said rotatable element to said part when energized, time-controlled means for controlling the energizing of said electrical devices, a driving member, and means for connecting said driving member to said rotatable element.

31. In combination, a rotary part, a rotatable element adapted to be driven therefrom, a clutch mechanism for connecting said rotatable member to said part, separate time controlled electro-magnetic devices for actuating said clutch mechanism when energized to connect and disconnect said member from said part and time controlled means for controlling the energizing of said electro-magnetic devices.

32. In combination, a rotary part, a rotatable element adapted to be driven therefrom, means for connecting said rotatable element to said part and electrically-controlled means for disconnecting said rotatable member from said part and for positively stopping its rotation, and time-controlled means for controlling said electrical means.

33. In combination, a rotary part, a rotatable element adapted to be driven therefrom, electrically-controlled means for controlling the connection between said element and said part, electrically-controlled means for disconnecting said rotatable element from said part and for positively stopping it, and time-controlled means for controlling said electrically-controlled means.

34. In combination, a rotary part, a rotatable element adapted to be driven therefrom, a clutch mechanism for connecting said rotatable element to said part, time-controlled electro-magnetic means for actuating said clutch mechanism to connect said element from said part, time-controlled electro-magnetic means for actuating said clutch mechanism to disconnect said element from said part when energized and for positively stopping the rotation of said element while energized.

35. In combination, a rotary part, a rotatable element adapted to be driven therefrom, a spring-actuated means for rotating said element in one direction, means for connecting said element to said part to rotate it in the opposite direction, and electrically-controlled means when energized for disconnecting said element from said part and for positively stopping it, said element returning to its normal position under the tension of said spring when said last named electrically-controlled means is deënergized.

In witness whereof I subscribe my signature, in the presence of two witnesses.

HANNIBAL C. FORD.

Witnesses:
 WALDO M. CHAPIN,
 HENRY MOAKLEY.